United States Patent Office 2,828,254
Patented Mar. 25, 1958

2,828,254

METHOD OF FORMING A HIGH FRICTION ELEMENT

Frederick Fahnoe, Morristown, and James J. Shyne, Arlington, N. J., assignors to Vitro Corporation of America, Verona, N. J.

No Drawing. Application January 5, 1954
Serial No. 402,402

3 Claims. (Cl. 204—181)

Our invention relates to method of making friction elements.

The generic term friction element applies to such devices as friction clutches and brakes, bearings, bushings and other like articles wherein one member slidably engages another member or wherein two bodies in contact with each other are adapted to move relative to each other. Certain of these devices such as friction clutches and brakes require elements with high coefficients of friction and such elements are hereinafter referred to as high friction elements; other devices such as bearings and bushings require elements with low coefficients of friction and such elements are hereinafter referred to as low friction or anti-friction elements.

While typical operating conditions vary with the type of element, certain common problems exist. For example, in order to prevent fade, freeze-up, and other associated phenomena, the frictional coefficient of any element ideally should be held constant and in particular should be substantially independent of temperature. As far as is known to us, known elements have frictional coefficients whose values change sharply with temperature. Typical operating temperatures for both high friction and low friction elements have greatly increased over those used only a few years ago and an urgent demand has been created for frictional elements whose frictional coefficients have improved thermal stability. Moreover, the element itself must be securely bonded to a supporting member; known bonds will rapidly disintegrate at these increased temperatures. Furthermore, the working surfaces of known elements will deteriorate rapidly and fail under the influence of the severe thermal stresses created by these temperatures.

Accordingly, it is an object of the present invention to provide improved friction elements which obviate these disadvantages.

It is another object to provide novel methods for producing these improved elements.

A further object is to provide improved friction elements with thermally stable frictional coefficients.

Still a further object is to provide a novel method for electrophoretically forming friction elements.

Yet a further object is to provide a novel method for bonding friction elements to a supporting member.

Another object is to provide friction elements which exhibit good resistance to wear at high operating temperatures.

In our copending application, S. N. 386,882, filed October 19, 1953, we disclosed processes for forming multiple layer constructions which made use of electrophoretic deposition. We have now discovered that the electrophoretic techniques disclosed therein can also be used in producing friction elements.

Electrophoretic deposition occurs when an electrostatic field is established between two electrodes immersed within a colloidal or gross dispersion of charged particles, thus causing the migration of the suspended particles toward one of the electrodes and producing the deposit of an adherent coating on that electrode. Exceptional uniformity of coating thickness and compacting (with an attendant relatively high coating density) are obtained as compared with dipping, spraying, brushing, and other more conventional methods of application. Irregularly shaped objects of any desired contour can be coated with excellent uniformity and reducibility of coating. Further details of this process will be found in the above mentioned application.

In the present invention, a mixture comprising a major portion by weight of particles of a reducible metallic compound and a minor portion by weight of particles of suitable friction characteristics modifying agents is electrophoretically codeposited on a base member of any desired shape and contour. The coated member is then heated to a temperature less than the softening temperature of the compound, if necessary in a reducing atmosphere, to reduce the metallic compound to metal and form a metal matrix whose interstices entrap the particles of the friction modifying agents. The amounts of friction modifying agent and matrix forming material are such that the layer after reduction contains 80–95% by weight of metallic matrix and 20–5% of friction modifying agent. As the reduction takes place, co-diffusion between the deposited metal and the base member occurs at their interface and a strong durable bond is formed.

For high friction elements adapted, for example, to withstand temperatures on the order of 2000° F., the reducible compound for example can be oxides of such refractory metals as nickel, copper, iron, chromium, or alloys of these metals. The friction modifying agent must have a high friction coefficient and can be, for example, molybdenum disilicide, aluminum oxide and the like.

For low or anti-friction elements adapted, for example, to withstand temperatures on the order of 500° F., the reducible compounds can be of the type indicated above but also can be oxides of tin, lead, silver or their alloys. The friction modifying agent must have a low friction coefficient and can be, for example, a lubricant such as molybdenum disulfide, tungsten disulfide, uranium disulfide, graphite and the like.

The base member in this type of application is generally composed of various metals and alloys. Electrophoretic deposition can only occur satisfactorily when the receiving surface has an electrical conductivity at least equal to that of a semi-conductor. In the event that the base member to be used has a non-conductive receiving surface, this surface must first be treated to render it conductive before the deposition takes place, for example, by one of the methods disclosed in our copending application, S. N. 398,129, filed December 14, 1953, now abandoned.

The following examples set forth certain well-defined instances of the application of this invention. They are, however, not to be considered as limitations thereof, since many modifications may be made without departing from the spirit and scope of this invention.

*Example I*

A mixture containing 87% by weight of nickel oxide particles and 13% by weight of molybdenum disilicide particles dispersed in isopropyl alcohol and diluted to a 5% concentration in the manner outlined in the aforesaid copending application S. N. 386,882.

This dispersion was then poured into a conventional electrophoretic bath. An annular stainless steel disc ⅛″ thick with an external diameter of 12″ and an internal diameter of 8″ was suspended in the dispersion. A flat steel plate was suspended in the dispersion in such manner that the plate surfaces and disc surfaces were parallel. The plate-disc separation was adjusted to 2". A direct voltage of 325 volts was applied between the disc and plate with such polarity that the disc functioned as the cathode. Nickel oxide and molybdenum disilicide particles immediately began to codeposit on that surface of the disc which faced the plate. After a 45-second interval, the disc was disconnected and removed from the bath. The codeposited coating attained a thickness of 100 microns during this interval.

The disc was then fired in hydrogen at a temperature of 1475° F. for a period of 20 seconds. Subsequent cross-sectional analysis established that the nickel oxide was reduced to nickel in the form of a matrix securely bonded by codiffusion to the surface of the disc. The molybdenum disilicide particles did not enter into the reaction but were entrapped within the pores or interstices of the nickel matrix. The ratio by weight of nickel to molybdenum disilicide was found to be approximately 9 to 1.

Tests revealed tht the coefficient of friction for this coated disc was on the order of .4 and exhibited little variation as the operating temperature was increased from 70° F. to 1900° F. As the temperature increased beyond this latter value and approached the melting temperature of nickel (on the order of 2500° F.) accurate friction values could not be obtained due to structural and surface charges in the nickel. The molybdenum disilicide due to its higher melting temperature (on the order of 3400° F.) retained its initial structural characteristics.

By repeating the deposition and firing process as many times as necessary, it was found that coating thicknesses up to 3000 microns and higher could be built up on the disc.

The above process was repeated with different firing temperatures and different weight percentages for the nickel oxide and molybdenum disilicide. When the percentage by weight of the molybdenum disilicide was too large, on the order of 20%, the nickel matrix was too weak and not well bonded to the disc and the entire coating tended to disintegrate into powder. Best results were obtained by maintaining the percentage by weight of nickel within the range 80–95%. All firing temperatures falling within the range 1300–1800° F. were found to be satisfactory.

When the discs prepared in this manner were tested in a disc friction clutch, it was noted that there was a tendency at high temperatures for the discs to freeze. Therefore, a small amount, on the order of 1% by weight, of molybdenum disulfide was added to the nickel oxide-molybdenum disilicide dispersion and the disc was then prepared as outlined above. The lubricating action of the disulfide was found sufficient to prevent freezing. While molybdenum disulfide normally oxidizes at relatively low temperatures, the quantity is so small in comparison to the other materials that whatever oxidation does take place does not adversely affect the operation.

If higher oxidation temperatures are required, a like amount of tungsten disulfide can be substituted for the molybdenum disulfide.

*Example II*

A gross dispersion containing 85% by weight of copper oxide particles and 15% by weight of aluminum oxide was immersed in isopropyl alcohol and diluted to a 5% concentration.

This dispersion was then poured into a conventional electrophoretic bath. A steel disc ½" thick with a diameter of 5" was suspended in the dispersion. A flat steel plate was suspended in the dispersion in such manner that the plate surfaces and disc surfaces were parallel. The plate-disc separation was adjusted to 2½". A direct voltage of 500 volts was applied between the disc and plate with such polarity that the disc functioned as the cathode. Copper oxide and aluminum oxide particles immediately began to codeposit on that surface of the disc which faced the plate. After a 50 second interval, the disc was disconnected and removed from the bath. The codeposited coating attained a thickness of 95 microns during this interval.

The disc was then fired in hydrogen at a temperature of 1300° F. for a period of 25 seconds. Subsequent cross-sectional analysis established that the copper oxide was reduced to copper in the form of a matrix securely bonded by codiffusion to the surface of the disc. The aluminum oxide particles did not enter into the reaction but were entrapped within the interstices of the copper matrix. The ratio by weight of copper to aluminum was found to be approximately 9 to 1.

Tests revealed that the coefficient of friction for this coated disc was on the order of .55 and exhibited little variation as the operating temperature was increased from 70° F. to 1400° F. As the temperature increased beyond this latter value and approached the melting temperature of copper (on the order of 1900° F.), accurate friction values could not be obtained due to structural and surface changes in the copper. The aluminum oxide, due to its higher melting temperatures, retained its initial structural charcteristics.

The coating thickness can be built up in the same manner as set forth in Example I. The firing temperatures and the weight percentages of the copper oxide-aluminum oxide mixture were varied in the same manner as Example I with substantially the same results.

*Example III*

A mixture comprising about 86% by weight silver oxide particles, about 6% by weight of copper oxide particles and about 8% by weight of molybdenum disulfide particles was ball milled for a period of from 100 to 200 hours in 5% concentration in a medium of 50% by weight of glycerine and 50% by weight of isopropyl alcohol. The resulting dispersion was activated by continuous agitation for a period of about one hour.

This dispersion was then poured into a conventional electrophoretic bath. A steel sleeve 6" in length and having an internal diameter of 2" was suspended in the dispersion. A steel rod 6" in length and having a diameter of ¼" was suspended in the dispersion in such manner that the axis of the rod coincided with the axis of the sleeve. A direct voltage of 250 volts was applied between the sleeve and rod with such polarity that the sleeve functioned as the cathode. The silver oxide-copper oxide-molybdenum sulfide particles immediately began to deposit uniformly on the internal surface of the sleeve. After a 55 second interval, the sleeve was disconnected and removed from the bath. The deposited coating attained a thickness of 90 microns during this interval.

The coated sleeve was then fired in hydrogen at a temperature of 1300° F. for a period of 15 seconds. Subsequent cross-sectional analysis revealed that a silver-copper matrix was formed and bonded to the sleeve. The molybdenum disulfide was entrapped within the interstices of the matrix. The disulfide, due to the presence of hydrogen, was not oxidized to any appreciable extent during the firing operation. The weight composition of the reduced coating was about 85% silver, 5% copper and 10% molybdenum disulfide.

Tests revealed that the coefficient of friction for the sleeve was on the order of .10 and exhibited little variation as the operating temperature was increased from 70° F. to 500° F. As the temperature increased beyond this latter value, matrix began to soften and separate from the sleeve.

The coating thickness can be built up in the same manner as set forth in Example I. This experiment was repeated with various percentages of molybdenum disulfide and it was found that best results were obtained by maintaining the percentage by weight of molybdenum disulfide between the limits of 5 to 15%.

*Example IV*

Example III was repeated using an initial mixture of lead oxide, tin oxide, copper oxide and graphite particles. After electrophoretic deposition of the particles and subsequent firing at a temperature of 800° F. for a period of 30 seconds, a matrix of a lead-tin-copper alloy containing entrapped graphite was formed having a composition by weight of 78.4% lead, 9.0% tin, 2.6% copper and 10% graphite.

The coefficient of friction of this sleeve was found to be on the order of .1 over the same general range as Example III. Increasing the percentage of graphite decreases the coefficient of friction but also weakens the matrix structure so that best results are obtained by maintaining the percentage by weight of graphite within the range 5-15%.

Although in the above examples, we have indicated certain definite firing temperatures, duration of reactions, types of materials, coefficients of friction, etc., it is to be understood that any or all of these can be varied widely within the scope of our invention, since the particular conditions of operation are governed largely by the specific end structure desired. For example, the firing temperature must be high enough to perform the desired reduction and low enough to prevent softening or melting of the materials used. The actual temperature used will vary depending on the characteristics of these materials.

Therefore, it is apparent that many widely different embodiments of this invention can be made without departing from the spirit and scope thereof and we do not intend to be limited except as indicated in the appended claims.

What is claimed is:

1. The method of forming a high friction element which comprises the steps of electrophoretically depositing a particle mixture having a metallic matrix forming material of the group consisting of nickel oxide and copper oxide, and a friction material of the group consisting of molybdenum disilicide and alumina out of an organic medium upon a selected surface of a metallic base member, the amount of said matrix forming material and friction material producing a layer having 80-95% by weight of metallic matrix and 20-5% of friction material, and heating said member in a reducing atmosphere at a temperature to reduce said matrix forming material to form a metallic matrix bonded to said member whose interstices are filled with said friction material, without reducing said friction material.

2. The method of claim 1 in which the matrix forming material is copper oxide, the friction material is alumium oxide, and the member is heated in a hydrogen atmosphere to reduce said copper oxide to copper.

3. The method of forming a high friction element which comprises the steps of electrophoretically depositing a particle mixture having a composition of 80 to 95% by weight of nickel oxide, 20 to 5% by weight of molybdenum disilicide, and about 1% by weight of molybdenum disulfide out of an organic media upon a selected surface of a metallic base member; and heating said member to a temperature within the range 1300-1800° F. in a hydrogen atmosphere until said nickel oxide is reduced to nickel whereby a nickel matrix is formed which is bonded to said member and whose interstices are filled with said disilicide and said disulfide particles.

References Cited in the file of this patent

UNITED STATES PATENTS

| | | |
|---|---|---|
| 2,202,054 | Hensel et al. | May 28, 1940 |
| 2,488,731 | Lambert et al. | Nov. 22, 1949 |
| 2,530,546 | Snyder | Nov. 21, 1950 |
| 2,576,362 | Rimbach | Nov. 27, 1951 |
| 2,640,024 | Palmateer | May 26, 1953 |
| 2,650,975 | Dorst | Sept. 1, 1953 |
| 2,708,726 | Atherton | May 17, 1955 |

FOREIGN PATENTS

| | | |
|---|---|---|
| 1,044,212 | France | June 17, 1953 |